Dec. 3, 1968  T. J. REESE ET AL  3,414,395
METHOD AND APPARATUS FOR SHAPING GLASS SHEETS
Filed March 3, 1964  2 Sheets-Sheet 2
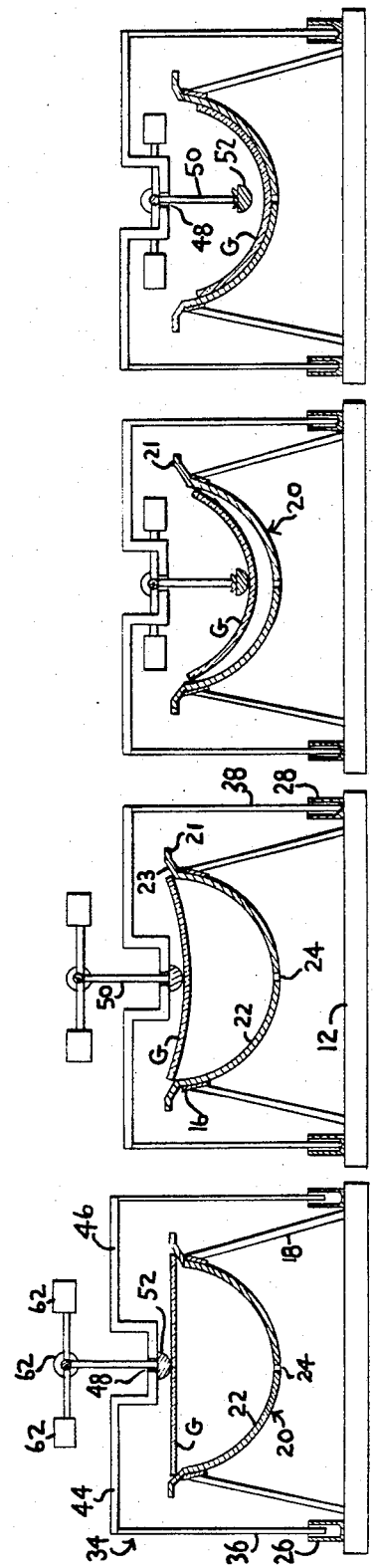
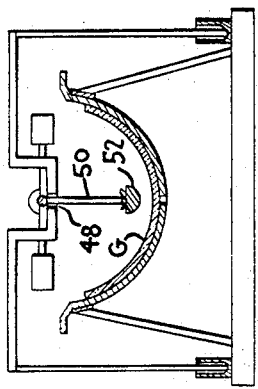
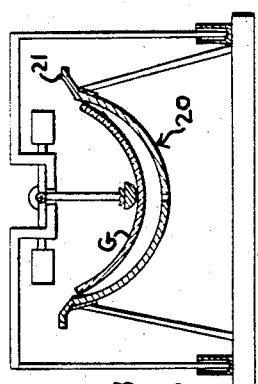
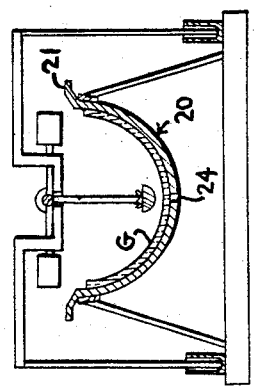
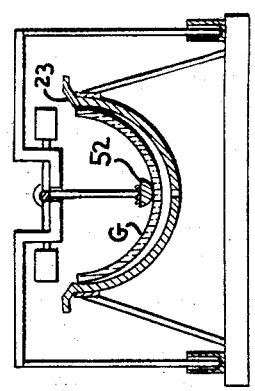
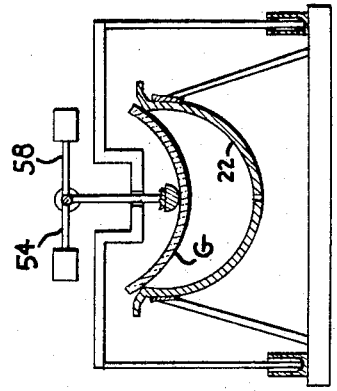
INVENTORS
THOMAS J. REESE
RUSSELL J. CORSI
BY
Oscar L. Spencer
ATTORNEY United States Patent Office 3,414,395
Patented Dec. 3, 1968

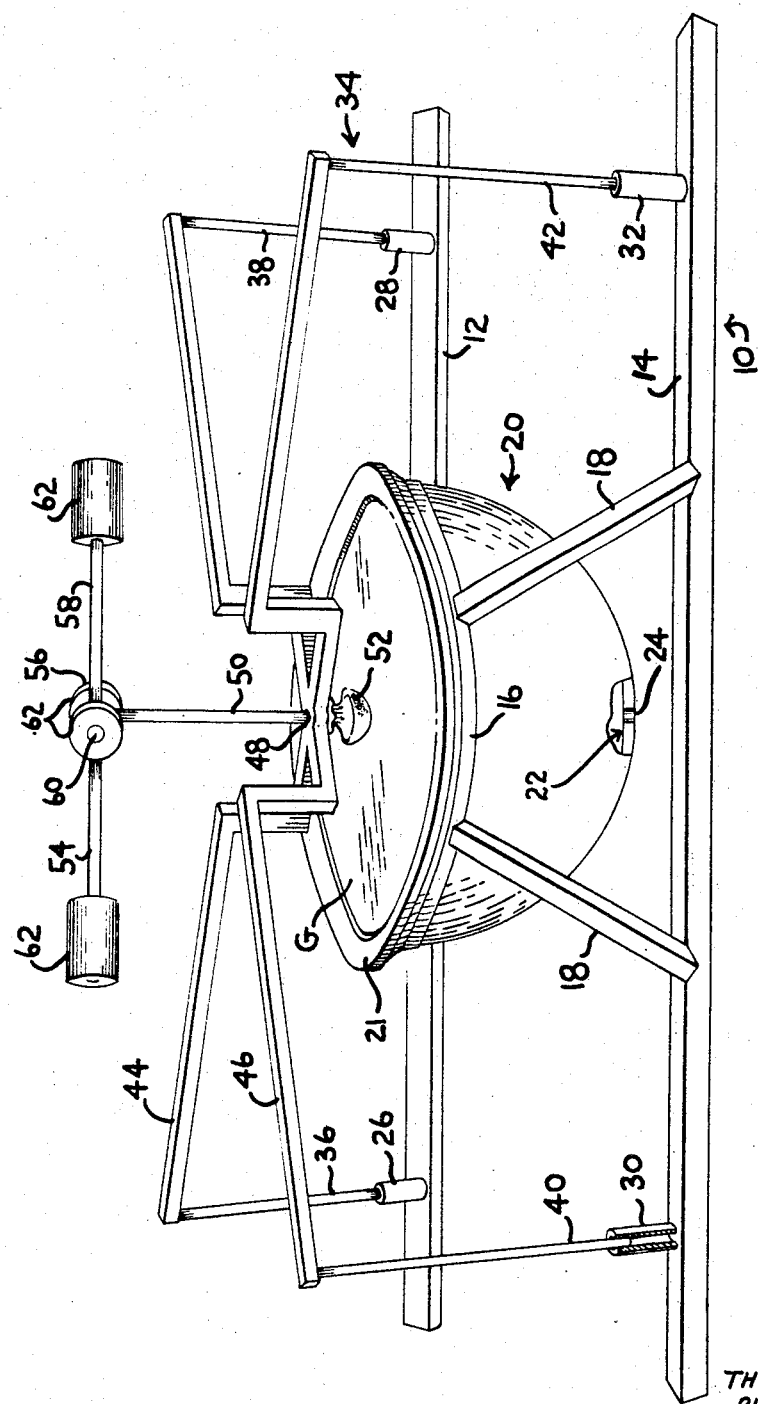

3,414,395
METHOD AND APPARATUS FOR
SHAPING GLASS SHEETS
Thomas J. Reese, Sarver, and Russell J. Corsi, Tarentum, Pa., assignors to PPG Industries, Inc., a corporation of Pennsylvania
Filed Mar. 3, 1964, Ser. No. 349,103
12 Claims. (Cl. 65—107)

This application relates to shaping glass sheets and specifically refers to the fabrication of glass hemispheres by a heat-sagging technique.

The shaping of glass sheets by heat-sagging is well known. Glass sheets are heated to deformation temperature (about 1080 degrees Fahrenheit for commercial plate glass ¼ inch thick to above 1200 degrees Fahrenheit for the same glass composition in sheets ¾ inch thick) until the heated glass sheet sags by gravity to conform to a curved shape.

It has also been known to accelerate heat-sagging by applying mechanical force to facilitate shaping the glass at a lower temperature than is necessary for heat-sagging without a mechanical assist. Mechanical assistance is especially important for bending thick glass sheets (thickness more than ½ inch) because it becomes necessary to heat a thick glass sheet to a higher temperature to cause the glass to flow into a curved shape in a reasonable time by gravity sagging alone. Plate glass devitrifies on prolonged exposure to such elevated temperature. Devitrification occurs more rapidly at elevated temperatures than at lower temperatures.

One prior art technique of bending glass sheets by a method combining gravity sagging with mechanical force involves the use of counterweights which lift pivoted end portions of sectionalized molds supporting the end portions of glass sheets. The latter are lifted upward to form the bent glass sheet when the glass softens and the counterweights lift the end mold sections and the supported glass portion. The weight of the end mold section opposes the force of the counterweights so that the effectiveness of the counterweights of such bending apparatus is diminished by the weight of the end mold section.

Glass sheets have also been bent by supporting a glass sheet between upper and lower members having complementary shaping surfaces, heating the glass sheet to softening temeprature and sandwiching the sheet between the upper and lower members in such a manner that the force applied by the upper member acted upon the glass to cause it to conform to the shaping surface facing upward from the lower member. However, the bent glass sheet tended to develop marks of the shaping members and stretched into relatively thin portions in the areas where the sheets were sandwiched. Considerable effort was expended to minimize the area of sandwiching and to develop materials which would not mar the glass surfaces when they applied pressure to the glass while in a heat-softened state. Typical patents of this procedure are U.S. Patent No. 1,889,881 to Ralph C. Thompson and U.S. Patent No. 2,817,928 to Roger E. Lambert et al.

In addition, glass sheets have been formed by engaging one surface only with a movable plunger while the other surface of the glass remained out of contact with any solid member. A typical patent illustrating this technique to produce glass sign characters is U.S. Patent No. 1,248,582 to Roy R. Wiley. The latter technique is not desirable to bend glass to exact shapes, because of difficulty in controlling the shape of the glass as it is deformed, even though the marking and stretching caused by simultaneous engagement between shaping members is avoided.

The present invention makes effective use of a massive member to accelerate heat-sagging by gravity and, while especially adapted to produce hemispherical bends of thick glass sheets (thickness more than ½ inch), is not necessarily limited thereto.

The present invention comprises a method of bending a glass sheet wherein a glass sheet to be shaped is supported on the perimeter of a shaping surface of concave elevation in cross-section, heating the glass sheet to at least its deformation temperature to cause the glass to sag downward toward said shaping surface, applying mechanical force downward against a portion of the upper surface of said glass sheet in an area spaced within said perimeter during said heating to accelerate the downward sagging of the glass sheet, discontinuing the application of said mechanical force before the lower surface of said area of the glass sheet contacts said shaping surface, and continuing said heating after said mechanical force is discontinued until the lower surface of the glass sheet sags by gravity to conform to said shaping surface.

The present invention combines the best features of assisting the bending by mechanical force with those of gravity sagging alone. The step of applying mechanical force during the early stages of the bending cycle reduces the exposure time of the glass to elevated temperatures, thus reducing the tendency for the glass to devitrify. The gravity sagging step at the end of the bending cycle insures that the glass conforms exactly to the desired shape while minimizing the problems caused by sandwiching the sheet against both sides simultaneously.

The mechanical force may be applied in steps with a maximum force applied initially and reduced to a lesser force before the force is discontinued. In bending glass sheets to a hemispherical shape, the mechanical force is applied against the central region of the sheet.

One important end product made possible by the present invention is a hollow glass sphere having a nominal wall thickness greater than ½ inch and an outside diameter of 18 inches. These spheres are produced by laminating a pair of hemispheres fabricated according to the present invention along their thick "equator." Such spheres are suitable for containers for instruments in deep submergence studies.

Typical apparatus and a method of operation will be described in order to illustrate a practical manner of using the present invention.

In the drawings forming part of the present invention and wherein like reference numbers refer to like structural elements, FIG. 1 is a perspective view of one embodiment of the present invention;

FIGS. 2, 3, 4 and 5 are sectional views of one embodiment of the present invention taken during various stages of the bending cycle to show how it operates during the different stages; and FIGS. 6, 7, and 8 are similar views of another embodiment to illustrate how said other embodiment of the invention operates.

In the drawings, a mold support structure 10 comprises a pair of horizontally extending elongated rails 12 and 14. A metal ring 16 is connected to the rails 12 and 14 by a number of connecting members 18 extending inward and obliquely upward from the rails toward the ring.

The apparatus includes a ceramic mold 20 having an upper shaping surface 22 of concave elevation in cross-section extending downward and inward from an oblique flange 23. A reinforcing flange 21 surrounds the oblique flange 23.

The mold 20 is constructed of a castable aluminum oxide refractory consisting essentially of 93.6 percent by weight of a grog of tabular alumina aggregate (aluminum oxide). Its other essential ingredient is a calcium aluminate binder. Such a material is sold commercially under the trade name of "Puro-tab" castable by Kaiser Refractories Corporation of Oakland, California.

The mold is ¾ inch thick with its perimeter flange 21 extending outward horizontally. The upper surface of the oblique flange 23 supports the flat glass prior to bending.

The lower surface of the flange 23 rests on the ring 16. Thus, the ring 16 and the connecting members 18 serve as means supporting the mold intermediate and above the rails.

The mold is provided with an aperture 24 at its lowest portion to permit air entrapped between the glass sheet G and the mold shaping surface 22 to escape, thus permitting the glass to conform exactly to the entire shaping surface by avoiding the establishment of a high pressure pocket above the deepest portion of the mold. A narrow aperture of ⅛ inch diameter is sufficient for this purpose.

The rails 12 and 14 serve as sleds or guides that ride on conveyor rolls that transport the molds into and out of a furnace where the glass is subjected to a hot atmosphere sufficient to raise the glass temperature to its deformation temperature. As an alternative, the entire construction may be removably supported on a sled (not shown) for conveyance into and out of a furnace.

Rail 12 has a pair of cylindrical sleeves 26 and 28 attached to its upper surface and extending upward therefrom. Similarly a pair of cylindrical sleeves 30 and 32 are attached to the upper surface of rail 14. The four sleeves are located at the four corners of a quadrilateral area that may be shaped in the form of a rectangle.

Each of the cylindrical sleeves 26, 28, 30, and 32 receives a corner vertical post of a skeleton framework 34. Posts 36, 38, 40, and 42 of skeleton framework 34 are slidably received within sleeves 26, 28, 30, and 32 respectively.

The tops of the vertical posts are located above the horizontal plane of the upper surface of the mold perimeter 23 and are interconnected by a pair of horizontal cross members. The first horizontal cross member 44 interconnects the top of posts 36 and 42, while the second horizontal cross member 46 interconnects the top of posts 38 and 40.

The horizontal cross members 44 and 46 criss-cross one another in their center portion which is shown recessed vertically below the horizontal plane common to the tops of posts 36, 38, 40, and 42, but above the horizontal plane occupied by the upper surface of the mold perimeter flange 23. This recess is not necessary when the apparatus is used with a furnace sufficiently high to permit clearance within the limits of vertical movement on a glass engaging member to be described later.

An aperture 48 extends vertically through the intersection between horizontal cross members 44 and 46. A vertical slide rod 50 is slidably received by the aperture. Thus, the latter serves as a guide means for vertical movement of rod 50.

A glass engaging member comprising a core of "Marinite" (registered trademark) wrapped in a knitted fiber glass cloth cover it attached to the bottom of the slide rod 50 to form a glass engaging member 52. "Marinite" is used to designate a specific lime silicate bonded porous refractory composition having over 50 percent silica and alumina, the other major ingredients of which are iron (as $Fe_2O_3$), calcium oxide, and magnesium oxide.

Four weighted arms 54, 56, 58, and 60 extend radially from the upper end of the slide rod 50. A weight 62 of metal or other heavy composition capable of withstanding the heat of the furnace it attached to each of the arms to provide a balanced downward force necessary to accelerate the downward sagging of the glass sheet supported on the mold 20.

The length of the vertical slide rod 50 is less than the depth of glass bend defined by the mold shaping surface 22. Thus, the slide rod 50 and its glass engaging member 52 are free to move downward until the weighted arms contact the horizontal cross arms 44 and 46. At this lowest extreme vertical movement, the glass engaging member is preferably kept at a distance of about ½ inch plus the thickness of the glass sheet above the lowest portion of the shaping surface 22 with which it is aligned.

In a typical operation, the skeleton framework 34 is removed and a flat glass sheet is mounted on the oblique perimeter flange 23 surrounding the shaping surface 22. The framework is replaced with the vertical corner posts 36, 38, 40, and 42 thrust into the respective cylindrical sleeves 26, 28, 30, and 32. As seen in FIG. 2 of the FIGS. 2 to 5 embodiment, wherein the length of the posts is insufficient to reach the bottom of the sleeves when a flat glass sheet is supported in bending relation to the mold shaping surface, this embodiment applies a maximum downward force equal to the weight of the skeleton framework 34, the vertical slide rod 50, the glass engaging member 52 and the weighted arms 54, 56, 58, and 60 to the central portion of the glass during the early stages of the bending cycle.

After the glass sheet G has been softened by the application of heat, the skeleton framework 34 and the weighted glass engaging member 52 force the central region of the glass sheet downward until the vertical corner posts reach the lowest possible position within the sleeves shown in FIG. 3, wherein they make bearing contact with the rail surfaces at the bottom of the sleeves. At this point in the bending cycle, force applied to the upper surface of the glass sheet is reduced to the force supplied by the glass engaging member 52 and its attached vertical rod 50 and weighted arms 54, 56, 58, and 60.

When the intersected portion of the weighted arms make contact with the intersection of the recessed central portions of horizontal cross members 44 and 46 as depicted in FIG. 4, the glass sheet G is spaced about ½ inch above the mold. The glass engaging member 52 is stopped from further downward movement and the glass completes its sagging toward the shaping surface by heat-sagging alone until it assumes the position depicted in FIG. 5.

The partly bent glass sheet is removed from the mold and is then mounted in shaping relation to another mold having a shaping surface or sharper curvature than that of the partly bent glass sheet. In FIGS. 6, 7, and 8, the only downward force applied is obtained from the mass of the glass engaging member 52, its attached vertical slide rod 50, and the weighted arms attached to the rod. When the glass sags downward engaged by the glass engaging member 52 to the position depicted in FIG. 7, the glass engaging member is prevented from further downward movement and the glass sags by gravity sagging alone at high temperature into full conformity with the shaping surface as shown in FIG. 8.

Two embodiments of the present invention have been developed to bend glass sheets ¾ inch thick into hemispherical shapes of 18 inch diameter. In the first embodiment, such as depicted in FIGS. 2 to 5, the mass of the skeleton framework 34 augments the downward force of the glass engaging member 52 and its attached elements vertical slide rods 50 and weighted arms 54, 56, 58, and 60 during the early stages of the bending cycle. Application of a maximum downward force is especially important in bending flat glass sheets wherein the periphery of the glass extends beyond the mold perimeter 23 and insures the downward displacement of the central portion of the glass sheet before its marginal periphery sags downward about the periphery of the glass sheet shaping mold.

In the other embodiment of the invention depicted in FIGS. 6 to 8, the height of the vertical corner posts 36, 38, 40, and 42 is sufficient to have the entire skeleton framework 34 out of contact with the upper surface of the glass sheet mounted on the mold for bending. Thus, in the latter embodiment which is suitable for bending glass sheets into more sharply bent curvatures, the downward force is applied only through a glass engaging member 52 and the weight of its associated parts, vertical slide rod 50 and weighted arms 54, 56, 58, and 60. Production of 18 inch hemispherical shapes employing the second embodiment exclusively required five stages of bending. In the first of the five stages, a flat glass sheet was bent to a spherical section having a 31 inch diameter. The second bend reduced the diameter of the shaped sheet to 28 inches. In the third stage, it was reduced to 23 inches, in the fourth stage to 20 inches, and in the fifth and final stage to a hemisphere having the desired diameter of 18 inches.

When the embodiment depicted in FIGS. 2 to 5 was employed for the first stage of bending, it was possible to fabricate 23 inch diameter bends from flat glass sheets in a single stage. This was followed by two stages of bending equivalent to stages 4 and 5 of the earlier five stage operation employing the embodiment of FIGS. 6 to 8.

In order to provide a complete disclosure, a typical embodiment of the present invention will be described.

A mold of the type depicted in FIGS. 2 to 5 was preheated by being exposed to an ambient temperature of 750 degrees Fahrenheit for 10 minutes. The mold was removed from the lehr and a flat glass sheet 26 inches in diameter was mounted on the mold. The top of the glass sheet was covered with a partially slit flexible fibrous ceramic insulation material sold under the name of "Fiberfrax" by the Carborundum Company of Niagara Falls, New York. The skeleton framework 34 which contained the gass engaging member 52 was set in place by mounting the vertical posts 36, 38, 40, and 42 into sleeves 26, 28, 30, and 32. The shortness of the posts caused the glass to support the skeleton frame 34 as well as the weighted glass engaging member. The total weight of the glass engaging member 52 and associated weights was 7½ pounds and that of the skeleton frame 12½ pounds, so that the glass was subjected to a 20 pound downward force applied through the glass engaging member during the earlier stages of the bending cycle.

The glass-laden mold was reintroduced into the lehr which was maintained at 750 degrees Fahrenheit. The glass remained in the lehr subject to the downward force for two to three hours. During this period, the mold was moved by stages about every half hour to a hotter portion of the furnace until the temperature to which the glass was subjected reached 1,100 degrees Fahrenheit. At this stage of the proceedings, the glass-loaden mold was transferred through a flexible curtain into a bending zone maintained at an ambient temperature of 1260 degrees Fahrenheit. The glass was subjected to the 1260 degrees Fahrenheit atmosphere for 30 minutes. This was 15 minutes more than it took for the weighted arms 54, 56, 58, and 60 to contact the recessed center portion of the horizontal cross arms 44 and 46. This additional heat exposure after the pressure member reached its limit of downward movement permitted the glass sheet to sag the last half inch into conformity with shaping surface to form a spherical section about 23 inches in diameter.

The glass was removed from the 1260 degrees Fahrenheit atmosphere into one maintained at 1020 degrees Fahrenheit and kept there for 30 minutes for a temperature equalization step. Subsequently the glass-laden mold was subjected to periodic decreases in temperature to cool the bent glass to below the annealing range of glass (about 950 degrees Fahrenheit for soda lime silica commercial flat glass) to anneal the bent glass. The entire bending and annealing cycle, including the preheating, bending and annealing, took slightly more than 7 hours.

The glass removed from the mold had a diameter of curvature of 23 inches. The partly curved glass sheet was then placed upon a second mold of the type shown in FIGS. 2 to 5. The latter mold had a shaping surface of 20 inches in diameter which had been preheated in a manner similar to the manner of heating the first mold. The second stage of bending employed 10½ pounds of force on the central portion of the glass sheet throughout the preheating and bending cycle. The temperature cycle used during this phase was substantially the same as the previous phase, except that the bending zone temperature was 1240 degrees Fahrenheit and the downward sag continued for only ten minutes after the glass lost contact with the pressure member. Upon completion of the preheating, bending and annealing portions, the glass was removed, having been shaped to a spherical section having a curvature of 20 inch diameter.

The glass sheet was then transferred to a mold having a diameter of 18 inches which had been subjected to the same preheat treatment as the first two molds. In the third preheating, bending and annealing cycle, the downward force applied on the glass was 8½ pounds for the entire time that the glass was subject to the downward force. The time and temperature cycle was substantially identical for this bending operation as for the second bending operation, except that the bending temperature was 1260 degrees Fahrenheit.

Another feature of the present invention is that the bent glass was of substantially more uniform thickness at the lowermost portion of the hemisphere after bending than would be expected from continuous mechanical forming until the glass sheet made continuous contact with the mold shaping surface. When the glass engaging member contacts the glass sheet until the glass is sandwiched in pressurized contact between the shaping member and the under portion of the shaping surface, the central portion of the glass is reduced in thickness to such an extent that the end product is unacceptable.

Specific embodiments of the present invention have been described for purposes of illustration. Various obvious modifications may be made in the light of the present disclosure. The scope of the subject matter of the present invention is delineated by the claimed subject matter which follows.

What is claimed is:

1. A method of bending a glass sheet having a section of concave elevation that is intermediate that of a flat glass sheet and that of a spherical section into a spherical section comprising mounting said glass sheet over a spherical shaping surface having an upwardly facing contour of concave cross-section, heating said glass sheet to its deformation temperature to cause said sheet to sag downward toward said shaping surface, applying mechanical force downward against the central region of the upper surface of said glass sheet during said heating to accelerate said downward sagging until the central region of the glass sheet is sagged into close proximity to said shaping surface, discontinuing the application of said mechanical force before the central portion of said glass sheet contacts said shaping surface, and continuing said heating after said mechanical force is discontinued until the lower surface of said glass sheet sags without further applying said mechanical force to conform to said shaping surface.

2. A method according to claim 1, wherein said mechanical force is initially applied at a maximum and is reduced to a lesser force before it is discontinued.

3. A method of bending a glass sheet into conformity with a shaping surface of concave elevation in cross-section comprising supporting said glass sheet on the perimeter of a shaping surface of concave elevation, heating said glass sheet to its deformation temperature to cause said glass sheet to sag downward toward said shaping surface, applying mechanical force downward against a portion of the upper surface of an area of said glass spaced inward of said perimeter during said heating to accelerate the downward sagging of said glass sheet, discontinuing the application of said mechanical force before the lower surface of said area of the glass sheet contacts said shaping surface, and continuing said heating after said mechanical force is discontinued until the lower surface of said glass sheet sags without further applying said mechanical force to conform to said shaping surface.

4. A method according to claim 3, wherein said mechanical force is initially applied at a maximum and is reduced to a lesser force before it is discontinued.

5. Apparatus for bending glass sheets comprising a mold support structure, a mold having an upwardly facing shaping surface of concave elevation in section, a skeleton framework supported on said mold support structure, guide means in said skeleton framework in spaced relation over said shaping surface, a vertical slide rod slidably supported for vertical movement through said guide means, a glass engaging member attached to the bottom end of said vertical slide rod, weight means attached to said vertical slide rod in spaced relation to said glass engaging member, and stop means on said skeleton framework for limiting the lowest position of said glass engaging member to one in closely adjacent relation to said shaping surface but spaced therefrom a distance slightly greater than the thickness of the glass sheets undergoing bending.

6. Apparatus for bending a glass sheet comprising a mold support structure comprising a pair of elongated rails extending horizontally, a mold having an upwardly facing shaping surface of concave elevation, means connecting said mold to said rails and supporting said mold intermediate and above said rails, a pair of cylindrical sleeves rigidly attached to each of said rails, said sleeves being located at the four corners of a quadrilateral shaped area, a skeleton framework comprising a vertical post resting at its bottom end in each of said cylindrical sleeves, first and second horizontal members interconnecting the upper end of each diagonally opposite vertical post and located above said mold, said first and second horizontal members interconnecting with one another intermediate their ends and above said shaping surface, guide means at said interconnection between said first and second horizontal members, a vertical slide rod slidably supported for vertical movement through said guide means, a glass engaging member attached to the bottom end of said vertical slide rod, horizontal weighted arms extending radially from the upper end of said vertical slide rod, said vertical slide rod having a length less than the depth of the curvature defined by said mold shaping surface, and stop means limiting the lowest position attained by said slide rod to one wherein said glass engaging member is closely adjacent to said shaping surface but spaced therefrom a distance slightly greater than the thickness of said glass sheet.

7. Apparatus as in claim 6, wherein said vertical posts are mounted for sliding movement within said cylindrical sleeves between an upper position wherein said skeleton framework bears on said glass engaging member when the latter rests upon a glass sheet mounted on said mold for bending and a lower position wherein said skeleton framework bears on said mold support structure by bearing engagement of said vertical posts in said cylindrical sleeves.

8. A method of bending a glass sheet into a shape of concave elevation comprising
 (1) supporting the glass sheet along its marginal portion with its interior portion unsupported,
 (2) heating said glass sheet while so supported to an elevated temperature at which the glass is subject to deformation,
 (3) applying a downward mechanical force against the upper surface of said glass sheet inward of its supported marginal portion while continuing to support said sheet to accelerate its deformation,
 (4) discontinuing said downward mechanical force while continuing said heating to maintain said glass sheet at an elevated temperature at which it is subject to deformation,
 (5) engaging the lower surface of said glass sheet interior of its supported marginal portion onto said shaping surface while continuing to maintain said sheet at its deformation temperature with its upper surface disengaged from said downward mechanical force, and
 (6) gradually cooling said sheet while so engaged through the annealing range of temperatures.

9. A method of bending a flat glass sheet into the shape of a spherical section of a requisite diameter comprising bending the glass sheet to several successively sharper shapes intermediate its original shape and the shape required on successive molds having shaping surfaces of said successively sharper intermediate shapes by heating the glass to a temperature above its deformation temperature, applying a downward force against the upper surface of the sheet while supported in bending relation to each said mold in succession to accelerate downward sag of said sheet toward said mold, discontinuing said force application while permitting the glass sheet to sag into engagement with said mold, cooling said glass sheet bent to said shape of said supporting mold, transferring said bent sheet having said intermediate shape to a mold having a sharper surface and repeating this procedure on molds having successively sharper shaping surfaces until the glass sheet is supported on a mold of said requisite diameter and further bending said bent sheet from said sharpest intermediate shape into said shape having said requisite diameter.

10. A method according to claim 9, wherein said downward froce is reduced before it is discontinued while said glass sheet is being bent into conformity with at least one of said successive shapes.

11. A method of bending a flat glass sheet about ¾ inch thick and about 26 inches in diameter into a hemispherical shape about 18 inches in diameter comprising:
 (a) heating a hemispherical mold having a hemispherical shaping of about 23 inches in diameter for at least 10 minutes at 750 degrees Fahrenheit, mounting said flat glass sheet in bending relation to said mold, applying a downward force of about 20 pounds against the upper surface of said glass sheet for 2 to 3 hours while exposing said glass sheet and said mold to successively higher temperatures from about 750 to about 1100 degrees Fahrenheit, then exposing said glass sheet to a temperature of about 1260 degrees Fahrenheit for about 30 minutes, reducing said downward force to about 7.5 pounds and then discontinuing said downward force before said sheet sags to conform to said shaping surface of about 23 inches in diameter and continuing said heat exposure to about 1260 degrees Fahrenheit without said downward force for about 15 minutes to sag said sheet to conform to said hemispherical shaping surface of about 23 inches in diameter after said downward force is discontinued, cooling said glass laden mold by exposing the latter to an atmosphere maintained at about 1020 degrees Fahrenheit for about 30 minutes, then to successively lower temperatures until a temperature below the annealing range of said glass is obtained,
 (b) heating a hemispherical mold having a hemispherical shaping surface of about 20 inches diameter for at least 10 minutes at about 750 degrees Fahrenheit, transferring said glass sheet at a temperature below its annealing range from said mold having a shaping surface of about 23 inches in diameter to said mold having a shaping surface of about 20 inches in diameter, applying a downward force of about 10½ pounds for about 2 to 3 hours against the upper surface of said glass sheet while exposing said glass sheet and said mold to successively higher temperatures from about 750 to about 1100 degrees Fahrenheit, then exposing said glass sheet to a temperature of about 1240 degrees Fahrenheit, discontinuing said downward force before said sheet sags to conform to said shaping surface of about 20 inches in diameter, continuing said heat exposure to about 1240 degrees Fahrenheit in the absence of said downward force for about 10 minutes to sag said sheet to conform to said shaping surface of about 20 inches in diameter after said downward force is discontinued, cooling said glass laden mold by exposing the latter to an atmosphere maintained at about 1020 degrees Fahrenheit for about 30 minutes, then to successively lower temperatures until a temperature below the annealing range of said glass is obtained, (c) heating a hemispherical mold having a hemispherical shaping surface of about 18 inches in diameter for at least 10 minutes at about 750 degrees Fahrenheit, transferring said glass sheet at a temperature below its annealing range from said mold having a shaping surface of about 20 inches in diameter to said mold having a shaping surface of about 18 inches in diameter, applying a downward force of about 8½ pounds for about 2 to 3 hours against the upper surface of said glass sheet while exposing said glass sheet and said mold to successively higher temperatures from about 750 to about 1100 degrees Fahrenheit, then exposing said glass sheet to a temperature of about 1260 degrees Fahrenheit in the absence of said downward force for about 10 minutes to sag said sheet to conform to said shaping surface of about 18 inches in diameter after said downward force is discontinued, and cooling said glass laden mold by exposing the latter to an atmosphere maintained at a temperature of about 1020 degrees Fahrenheit, then to successively lower temperatures until a temperature below the annealing range of said glass is obtained, and removing the bent glass sheet from said last mold.

12. Apparatus for bending glass sheets comprising a mold having an upward facing shaping surface of concave elevation, a mold support, weighted glass engaging means for engaging the upper surface of a glass sheet mounted on said mold for bending, means guiding said glass engaging means for vertical movement relative to an inwardly disposed portion of said shaping surface in response to sagging of said glass sheet, and stop means operatively responsive to downward movement of said glass engaging means for stopping further downward movement of said glass engaging means toward said mold shaping surface when said glass engaging means reaches a position separated from said shaping surface by a distance slightly more than the thickness of said glass undergoing bending, and means for supporting said guiding means in said relation to said mold shaping surface, further including weight means for said weighted glass engaging means for initially applying a relatively heavy weight against said upper glass sheet surface when said weighted glass engaging means first engages the upper surface of a glass sheet molded on said mold for bending, and additional stop means positioned to disengage said weight means when said glass engaging means reaches a position separated from said shaping surface by a greater distance than said previously mentioned distance, thereby causing said weighted glass engaging means to apply a relatively light weight after said weight means is disengaged and before said glass engaging means is stopped from further downward movement.

UNITED STATES PATENTS

References Cited

| | | | |
|---|---|---|---|
| 1,633,117 | 6/1927 | McDanal | 65—106 |
| 2,218,654 | 10/1940 | Paddock | 65—107 |
| 2,377,849 | 6/1945 | Binkert et al. | 65—103 |
| 2,570,309 | 10/1951 | Black | 65—107 |

FOREIGN PATENTS 463,978  6/1951  Italy.

DONALL H. SYLVESTER, *Primary Examiner.*

R. L. LINDSAY, *Assistant Examiner.*

UNITED STATES PATENT OFFICE
CERTIFICATE OF CORRECTION

Patent No. 3,414,395　　　　　　　　　　　　　　　　　　　December 3, 1968

Thomas J. Reese et al.

It is certified that error appears in the above identified patent and that said Letters Patent are hereby corrected as shown below:

Column 8, line 33, "froce" should read -- force --.  Column 9, line 30, after "Fahrenheit" insert -- , discontinuing said downward force before said sheet sags to conform to said shaping surface of about 18 inches in diameter, continuing said heat exposure to about 1260 degrees Fahrenheit --.

Signed and sealed this 17th day of March 1970.

(SEAL)
Attest:

Edward M. Fletcher, Jr.　　　　　　　　　　WILLIAM E. SCHUYLER, JR.
Attesting Officer　　　　　　　　　　　　　　　Commissioner of Patents